(12) United States Patent
Kaiser

(10) Patent No.: US 7,612,328 B2
(45) Date of Patent: Nov. 3, 2009

(54) FOIL-TYPE PRESSURE SENSOR

(75) Inventor: Jean-Luc Kaiser, Erpeldange (LU)

(73) Assignee: IEE International Electronics & Engineering S.A., Luxembourg (LU)

(*) Notice: Subject to any disclaimer, the term of this patent is extended or adjusted under 35 U.S.C. 154(b) by 0 days.

(21) Appl. No.: 11/995,414

(22) PCT Filed: Jul. 11, 2006

(86) PCT No.: PCT/EP2006/064095

§ 371 (c)(1),
(2), (4) Date: Mar. 13, 2008

(87) PCT Pub. No.: WO2007/006782

PCT Pub. Date: Jan. 18, 2007

(65) Prior Publication Data

US 2008/0224029 A1    Sep. 18, 2008

(30) Foreign Application Priority Data

Jul. 11, 2005    (EP)    ................. 5106319

(51) Int. Cl.
G01J 1/04    (2006.01)
G01J 1/56    (2006.01)

(52) U.S. Cl. ............... 250/231.19; 250/227.14; 73/705

(58) Field of Classification Search ........... 250/231.19, 250/231.1, 227.14, 227.16; 73/705, 715, 73/800; 356/614
See application file for complete search history.

(56) References Cited

U.S. PATENT DOCUMENTS 4,078,432 A * 3/1978 Stewart ............... 73/705
4,405,197 A    9/1983 Bejczy
5,689,107 A    11/1997 Hsu

FOREIGN PATENT DOCUMENTS

DE    3236435    4/1984
DE    3916350    11/1990
FR    2578974    9/1986
FR    2604783    4/1988

OTHER PUBLICATIONS

International Search Report; PCT/EP2006/064095; Oct. 25, 2006.

* cited by examiner

Primary Examiner—Kevin Pyo
(74) Attorney, Agent, or Firm—Cantor Colburn LLP

(57) ABSTRACT

A foil-type pressure sensor includes a first foil and a second foil. A spacer is arranged in between the first and second foils, which keeps the foils at a certain distance from each other. The spacer presents an opening that defines a sensing region. In this sensing region, the first and second foils can be brought closer one to the other against the resiliency of the foils by pressure acting on the pressure sensor. The pressure sensor further includes light emitting means arranged between the foils for inputting light into the sensing region and light collecting means arranged between the foils for collecting light propagated from the light emitting means through at least part of the sensing region to the light collecting means. When the first and second foils are brought closer one to the other, at least one of the first and the second foils at least partially blocks light propagation through the sensing region.

10 Claims, 3 Drawing Sheets

FOIL-TYPE PRESSURE SENSOR

TECHNICAL FIELD OF THE INVENTION

The present invention generally relates to foil-type pressure sensors.

BRIEF DESCRIPTION OF RELATED ART

Foil-type pressure sensors generally comprise two foils sandwiching a spacer. The spacer is provided with an opening or cutout, which defines a sensing region, in which the foils face each other at a distance corresponding to the spacer thickness. Known foil-type pressure sensors have at least two electrodes arranged in the sensing region. The foils are flexible and can be brought into contact with each other in the sensing region, in response to pressure acting on the foils. An electrical contact is thereby established between the two electrodes, and an electrical circuit is thereby closed. Preferably, a resistive or semiconductive layer is arranged in the sensing region to achieve that the electrical resistance between the electrodes gradually decreases when the contact surface between the foils increases. Such a pressure sensor is e.g. disclosed in WO 02/097838.

Such a sensor can measure pressure only above a certain threshold pressure, which is the minimal pressure required for establishing an initial electrical contact between the electrodes. This can constitute a drawback in certain applications, e.g. when relatively small pressures are to be detected. Several options exist, which enable sensing of small pressures, e.g. reducing the spacer thickness, but they involve considerable constraints with regard to production tolerances or reduce the dynamic range of the sensor.

An important field of application of such pressure sensors is passenger presence detection in vehicles. A foil-type pressure sensor or an array thereof is arranged in the seating of a vehicle seat and detects whether the seat is loaded, respectively whether the measured load pattern corresponds to a load pattern generated by a passenger. With the increasing number of electronic components, electromagnetic interference has become a serious issue in the development of electronic car equipment. Electromagnetic compatibility of components is nowadays a requirement most suppliers of the automotive industry are faced with. There is still room for improvements regarding electromagnetic compatibility of pressure sensors.

BRIEF SUMMARY OF THE INVENTION

The invention provides an improved pressure sensor.

A foil-type pressure sensor comprises a first foil and a second foil. A spacer is arranged in between the first and second foils, which keeps the foils at a certain distance from each other. The spacer presents an opening (cut-out, recess) that defines a sensing region. In this sensing region, the first and second foils can be brought closer one to the other against the resiliency of the foils by pressure acting on the pressure sensor. According to an important aspect of the invention, the pressure sensor further comprises light emitting means arranged between the foils for inputting light into the sensing region and light collecting means arranged between the foils for collecting light propagated from the light emitting means through at least part of the sensing region to the light collecting means. At least one of the foils can be deflected resiliently by external pressure or force acting on the sensor. The first and the second foils can have identical properties (symmetric case) or different properties (asymmetric case). When the first and second foils are brought closer one to the other, at least one of the first and the second foils at least partially blocks light propagation through the sensing region.

The light emitting means and the light collecting means are arranged at a certain distance from each other in the sensing region or at the border thereof, e.g. embedded in the spacer. When no or little pressure is applied on the sensor, light paths through the medium of the sensing region exist between the light emitting means and the light collecting means. The medium can be a fluid, usually a gas. With pressure on the sensor increasing, the first and/or the second foil resiliently undergoes deformation in the sensing region, where it approaches the opposite foil. As a result, the deformed foil blocks light paths between the light emitting means and the light collecting means. The more the foils deflect towards each other, the more light is intercepted in the sensing region; the intensity of the light collected by the light collecting means thus depends on the amount of pressure acting onto the pressure sensor. It will be noted that, in contrast to the known foil-type pressure sensors, the foils need not to be in contact for pressure determination.

The present sensor hence is based on variable attenuation of the light propagating through the sensing region. The skilled person will appreciate that such a sensor is fairly insensitive to electromagnetic interference with other electronic devices as it is based on optical detection. Reliable detection is thus enabled also in electromagnetically "noisy" environment. Compared to traditional foil-type pressure sensors, the present invention has the further advantage of a simpler production.

The light emitting means may for instance comprise a light source, such as a LED, an OLED or a VECSEL in or adjacent to the sensing region. Preferably, however, the light emitting means comprises an end surface of an input optical waveguide, which is optically connected to a light source. The light source itself can thus be arranged remote from the sensor. A waveguide, e.g. an optical fibre, directs the light from the light source to the sensing region of the pressure sensor. Similarly, the light collecting means may comprise an end surface of an output optical waveguide, which is optically connected to a light detector. Alternatively, the light detector could be placed into or adjacent to the sensing region. As will be appreciated, the light detector can be a detector capable of performing relative or absolute measurements. The waveguides can be accommodated in a channel or a groove of the spacer.

When optical waveguides used for transmitting light to or from the sensing region bend or are subjected to stress, they can thereby induce additional losses, which could cause an erroneous pressure determination. A reference waveguide, positioned substantially parallel to the input waveguide and/or the output waveguide, is preferably used. The reference waveguide is not interrupted between the light source and the light detector, as opposed to the input and output optical waveguides in the sensing region. The reference waveguide undergoes substantially the same bending and stress as the other waveguides, which allows determining the light intensity losses in the waveguides. The light intensity detected by the light detector can thus be normalised and the sole pressure effect be determined. Use of a reference waveguide is especially well suited when a relative light intensity or light flux measurement is preferred over an absolute measurement. In the context of waveguide bending, it shall be noted that there are pressure sensors, which are based on light attenuation caused by bending of a waveguide. Deformation of the waveguide is necessary for operation of these sensors. In the present foil-type pressure sensor the waveguide can be protected against deformation and stress, which can lead to a longer sensor lifetime.

It will be appreciated that the sensor response can be tailored by variation of the sensor geometry. The shape of the opening can e.g. be tailored for specifically tailoring the mechanical response of the foils to pressure. The sensing region can be substantially smaller than a common pressure sensor with electrodes, because the mechanical behaviour of the foils in response to pressure is less critical. Alternatively, the sensing region can be of the same size or even bigger than common pressure sensors. The sensor response can be further adjusted by suitably choosing the configuration of the light emitting means and the light collecting means. The light emitting means and the light collecting means can face each other in the sensing region. They can be diametrically opposed or shifted laterally with respect to a virtual line passing centrally through the sensing region. When a homogeneous or central pressure acts upon the sensor, the central portions of the foils usually deflect first. Consequently, light paths extending through the central portion of the sensing region are likely to be interrupted before light paths passing along the border of the sensing region. The distribution of the light paths in the sensing region thus determines the sensor response for a given mechanical behaviour of the foils. One could also think of a configuration, wherein the light, after having travelled through the sensing region, hits a mirror and is reflected towards the output waveguide.

The light emitting means and the light collecting means can have any height (along a direction that is substantially orthogonal to the foils) or width (in a direction substantially parallel to the foils) compatible with the dimensions of the sensing region. They can e.g. have a height similar to the height of the spacer and a width similar to the width of the sensing region.

Advantageously, the first and/or second foils have a high absorption coefficient for the light propagating through the sensing region. The first and/or second foils can also be coated with a layer having a high absorption coefficient for the light propagating through the sensing region. Light falling onto an inner surface of the first or second foils is thus absorbed and thus eliminated from the sensing region. Alternatively, the inner surfaces of the foils can have a scattering structure.

The light emitting means and/or the light collecting means preferably comprise optics adapted for optimal coupling efficiency between the light emitting means and the light collecting means. When using optical waveguides, the numerical apertures of the input and output optical waveguides are advantageously chosen such that the coupling efficiency from input to output optical waveguide is optimal for the unloaded sensor. The optics may also comprise a lens associated with the light emitting means. The beam divergence can thereby be adjusted. If requested, a collimated beam can be shaped in the sensing region. An important advantage of the present sensing technique can be the reduced influence of bending of the sensor as a whole. In order to achieve that, the beam geometry can be adjusted in such a way that the coupling between input and output optical waveguides does not change significantly in response to sensor bending. This can e.g. be done by a light beam, which covers more than the end surface of the output waveguide. When the sensor slightly bends, the beam moves relatively to the output waveguide, but the amount of light coupled into it remains almost constant.

BRIEF DESCRIPTION OF THE DRAWINGS

Further details and advantages of the present invention will be apparent from the following detailed description of not limiting embodiments with reference to the attached drawings, wherein.

DETAILED DESCRIPTION OF THE INVENTION

Figure 1:
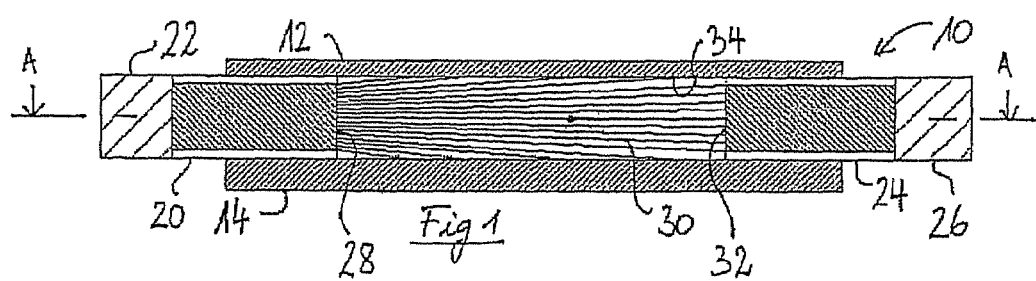
FIG. 1: is a cross-sectional view of a pressure sensor according to the present invention.
Figure 2:
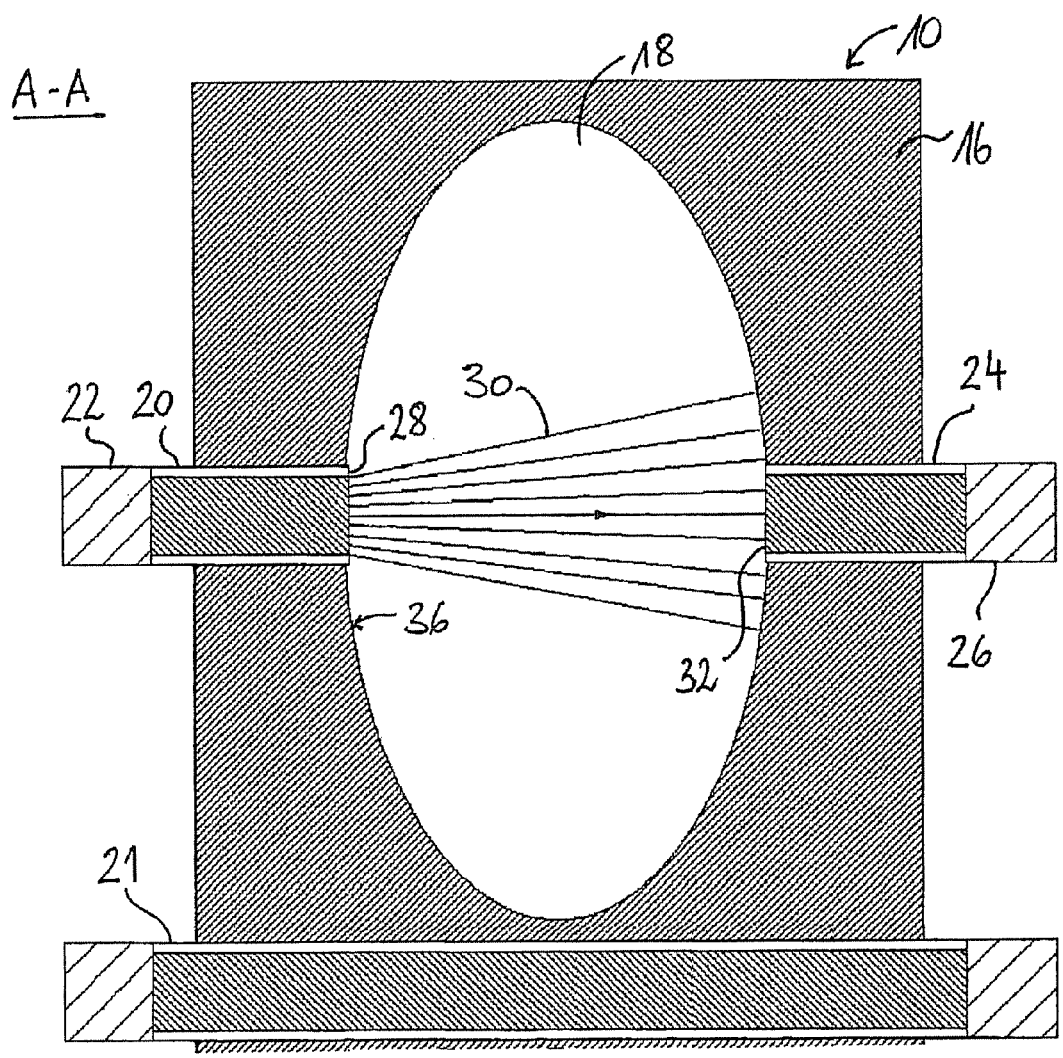
FIG. 2: is a top cross-sectional view of the pressure sensor along the plane A-A of FIG. 1.

FIGS. 1 and 2 show cross-sectional views of a pressure sensor 10 in unloaded condition. The pressure sensor 10 comprises a first flexible foil 12 and a second foil 14, which is significantly less flexible than the first foil 12 and thicker. The foils 12, 14 sandwich a spacer 16, which keeps the foils 12, 14 at a certain distance from each other. The spacer 16 presents an opening, which defines a sensing region 18 of the pressure sensor 10. Embedded into the spacer 16 is an input optical waveguide 20, which guides light coming from a light source 22 into the sensing region 18. An output optical waveguide 24 is arranged substantially aligned with the input optical waveguide 20, on the opposed side of the sensing region 18. The output optical waveguide 24 is optically connected to a light intensity detector 26. The thickness of the spacer 16, i.e. the height of the sensing region corresponds to at least the diameter of the waveguides or fibres 20, 24, which typically is comprised between 100 and 500 μm, preferably 250 μm.

The waveguides 20, 24 comprise a cladding and a core, wherein light can propagate. The light source 22 and the detector 26 thus can be arranged remote from the sensing region 18. The light source 22 can for instance comprise a LED, an OLED, a VECSEL, or the like.

In operation, the light source 22 injects light of a suitable wavelength into the input optical waveguide 20. The light propagates through the waveguide 20 and it is emitted into the sensing region at the end surface 28 of the waveguide 20. The light then propagates through the medium in the sensing region. Light propagation in the sensing cavity is illustrated by light rays 30. On the opposed side of the sensing region 18, a part of the light hits the end surface 32 of the output optical waveguide 24 and couples into the core of waveguides 24. Detector 26 detects the intensity of the light arriving through the waveguide 24. In FIG. 2, the end surfaces 28, 32 are shown to be substantially flush with the surface 36 of the spacer, which delimits the sensing region 18. When appropriate, however, one or both of the waveguides 20, 24 can protrude into the sensing region 18. As shown in FIG. 2, the pressure sensor 10 also comprises a continuous reference waveguide 21 positioned substantially parallel to the input optical waveguide 20 and the output optical waveguide 24.

Figure 4:
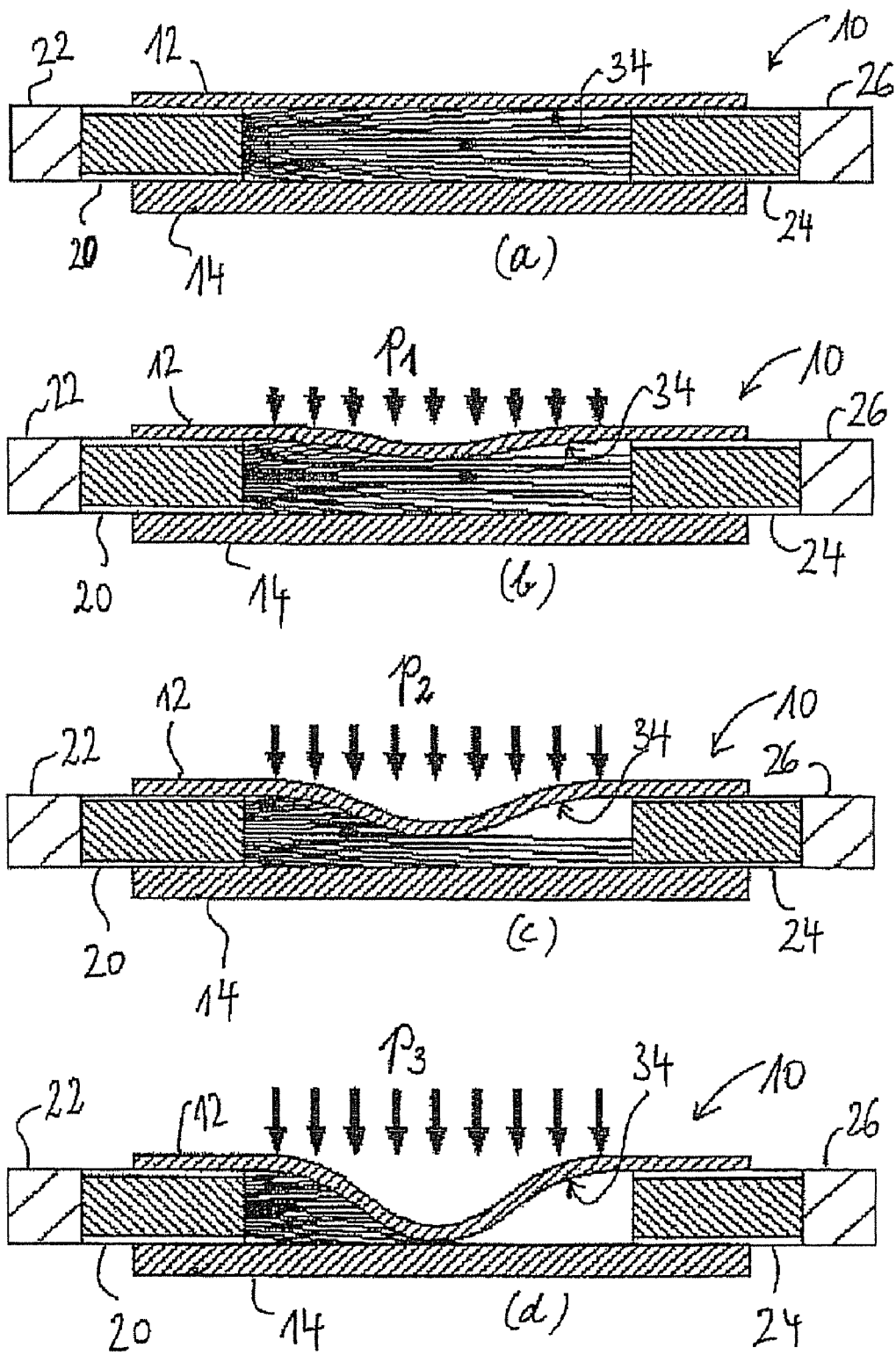
FIG. 4: is an illustration of the operating principle of a pressure sensor according to the present invention.

FIG. 4 shows the basic principle of operation of the pressure sensor. When no pressure load is applied to the foils (a), the coupling efficiency from input waveguide 20 to output waveguide 24 is maximal for a given pressure sensor 10. The optical intensity measured by the detector 26 is thus maximal. The pressure load on the sensor 10 is now gradually increased (b)-(d). When a pressure load p1 is applied onto the first foil 12, it deflects, which reduces the separation between the first and the second foils 12, 14 (b). When bent, the first foil 12 intersects light rays in the sensing region and absorbs a fraction of the light coupled out of waveguide 20. To enhance absorption, the inner surface 34 of the first foil 12 may be coated with a highly absorptive layer, i.e. a layer with a high absorption coefficient in the wavelength range of the light source. As a result of pressure, less light hits the end surface 32 and couples into the output optical waveguide 24. Consequently the light intensity detected at detector 26 is reduced with respect to the unloaded state. When the pressure load increases to p2, the first foil 12 is brought closer to the second foil 14 (c). More light is absorbed and the detected light intensity thus further decreases. When the pressure reaches a certain threshold p3, the first foil 12 comes into contact with the second foil 14 in a central portion of the sensing region 18. Only light rays that do not pass through this central portion could hit the end surface 32 of the output waveguide 24.

The shape of the sensing region is not necessarily round, but can be elliptical, as illustrated in FIG. 2 or have any other suitable shape.

Figure 3:
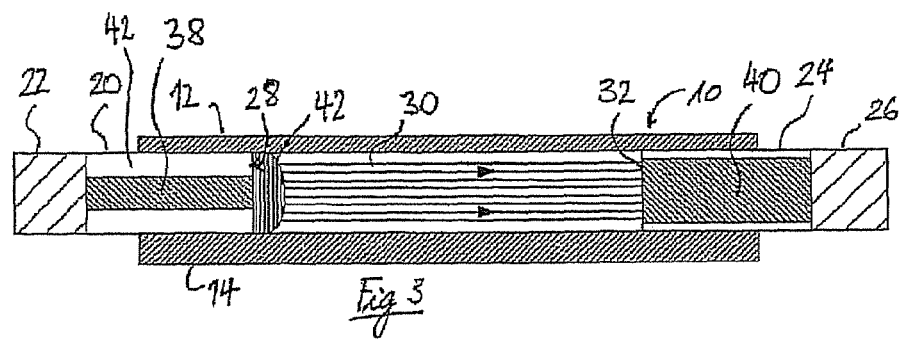
FIG. 3: is a cross-sectional view of another embodiment of a pressure sensor.

FIG. 3 shows a slightly different embodiment of a pressure sensor. The coupling efficiency between the input optical waveguide 20 and the output optical waveguide 24 has been optimised, i.e. the losses in the unloaded state have been minimised by the use of appropriate optics. The core 38 of the input waveguide 20 is substantially smaller than the core 40 of the output waveguide 24. The diameter of the waveguides is nevertheless substantially equal as the cladding 42 of the input waveguide 20 is enlarged so as to compensate for the reduced core size. A plano-convex lens 42 is located at the end surface 28 of the input optical waveguide 20. The lens 42 collimates the light coupled out of the waveguide 20 in such a way that the light rays 30 are parallel or nearly parallel, when they travel through the sensing region 18. On the opposed side of the sensing region, the collimated light couples into the output waveguide 24.

The invention claimed is:

1. A foil-type pressure sensor comprising;
   a first foil and a second foil;
   a spacer in between said first and second foils, said spacer having an opening defining a sensing region in which the first and second foils can be brought closer one to the other against a resiliency of the foils by pressure acting upon said pressure sensor;
   light emitting means arranged between said foils for inputting light into said sensing region; and
   light collecting means arranged between said foils for collecting light propagated from said light emitting means through said sensing region to said light collecting means;
   wherein at least one of said first and second foils at least partially blocks light propagation through said sensing region when the first and second foils are brought closer one to the other.

2. A pressure sensor according to claim 1, wherein said light emitting means comprises an end surface of an input optical waveguide, which is optically connected to a light source.

3. A pressure sensor according to claim 2, comprising a continuous reference waveguide positioned substantially parallel to said input waveguide.

4. A pressure sensor according to claim 1, wherein said light collecting means comprises an end surface of an output optical waveguide, which is optically connected to a light detector.

5. A pressure sensor according to claim 4, comprising a continuous reference waveguide positioned substantially parallel to said output waveguide.

6. A pressure sensor according to claim 1, wherein said light emitting means and said light collecting means face each other in the sensing region.

7. A pressure sensor according to claim 1, wherein said first and/or second foils have a high absorption coefficient for the light propagating through the sensing region.

8. A pressure sensor according to claim 1, wherein said first and/or second foils are coated with a layer having a high absorption coefficient for the light propagating through the sensing region.

9. A pressure sensor according to claim 1, wherein said light emitting means and/or said light collecting means comprise optics adapted for optimal coupling efficiency between said light emitting means and said light collecting means.

10. A pressure sensor according to claim 9, wherein said optics comprise a lens associated with said light emitting means.

* * * * *